(12) United States Patent
Oyama et al.

(10) Patent No.: US 8,544,791 B2
(45) Date of Patent: Oct. 1, 2013

(54) PEDAL OPERATED APPARATUS FOR CONTROLLING AN AIRCRAFT NOSE WHEEL STEERING SYSTEM

(75) Inventors: Hiroki Oyama, Summerfield, NC (US); Michimasa Fujino, Jamestown, NC (US)

(73) Assignee: Honda Motor Co., Ltd., Tokyo (JP)

( * ) Notice: Subject to any disclaimer, the term of this patent is extended or adjusted under 35 U.S.C. 154(b) by 1187 days.

(21) Appl. No.: 12/415,120

(22) Filed: Mar. 31, 2009

(65) Prior Publication Data
US 2010/0044500 A1    Feb. 25, 2010

Related U.S. Application Data

(60) Provisional application No. 61/040,901, filed on Mar. 31, 2008.

(51) Int. Cl.
*B64C 25/50* (2006.01)

(52) U.S. Cl.
USPC .......................................... 244/50; 244/234

(58) Field of Classification Search
USPC ............... 244/50, 220, 221, 223–236, 103 R, 244/118.5, 196
See application file for complete search history.

(56) References Cited

U.S. PATENT DOCUMENTS

| | | | |
|---|---|---|---|
| 1,620,368 A | 3/1927 | McElhaney | |
| 1,873,906 A * | 8/1932 | Ring et al. | 74/512 |
| 2,340,237 A * | 1/1944 | Upson | 244/232 |
| 2,379,173 A | 6/1945 | Miller | |
| 2,585,688 A * | 2/1952 | Saulnier | 244/235 |
| 2,760,739 A | 8/1956 | Reichert | |
| 2,814,452 A | 11/1957 | Blanchard et al. | |
| 2,944,770 A * | 7/1960 | Patin et al. | 244/223 |
| 2,998,211 A | 8/1961 | Evans | |
| 3,489,376 A * | 1/1970 | Johannes et al. | 244/50 |
| 3,576,302 A * | 4/1971 | Palfreyman | 244/236 |
| 3,715,094 A * | 2/1973 | Cohn | 244/233 |
| 3,753,540 A * | 8/1973 | Renner | 244/50 |
| 3,931,943 A | 1/1976 | Westergren et al. | |
| 4,470,570 A * | 9/1984 | Sakurai et al. | 244/235 |
| 4,759,515 A * | 7/1988 | Carl | 244/76 R |
| 4,848,708 A * | 7/1989 | Farrell et al. | 244/235 |
| 5,056,742 A * | 10/1991 | Sakurai | 244/235 |
| 5,100,081 A * | 3/1992 | Thomas | 244/220 |
| 5,158,459 A | 10/1992 | Edelberg | |
| 5,482,228 A * | 1/1996 | Hoshino | 244/50 |
| 5,613,651 A | 3/1997 | Meneghetti | |
| 5,725,184 A | 3/1998 | Kang et al. | |
| 5,878,981 A * | 3/1999 | Dewey | 244/190 |
| 7,690,604 B2 * | 4/2010 | Christensen et al. | 244/235 |
| 7,726,611 B2 * | 6/2010 | Christensen et al. | 244/235 |

* cited by examiner

*Primary Examiner* — Rob Swiatek
*Assistant Examiner* — Valentina Xavier
(74) *Attorney, Agent, or Firm* — Rankin, Hill & Clark LLP

(57) ABSTRACT

A pedal operated apparatus controls an aircraft rudder during flight using a mechanical linkage and controls a nose wheel power steering system while the aircraft is on the ground. The apparatus includes a pair of foot pedals operatively connected to the rudder and also connected to the power steering system. Springs are operatively connected to the pedals only when the aircraft is on the ground to center the nose wheel after a turn. The springs are operatively disconnected when the aircraft is in flight.

19 Claims, 9 Drawing Sheets

PEDAL OPERATED APPARATUS FOR CONTROLLING AN AIRCRAFT NOSE WHEEL STEERING SYSTEM

FIELD OF THE INVENTION

The present invention relates to aircraft control systems and, more particularly, to a pedal operated system for controlling both the aircraft rudder while the aircraft is in flight and a nose wheel steering mechanism when the aircraft is on the ground.

BACKGROUND

The availability of relatively small turbofan engines for use in aviation resulted in the development of small jet aircraft. Because these aircraft are so light, they can use purely mechanical linkages (e.g., cables, push-pull rods etc.) for operating in-flight control devices such as ailerons, elevators, and rudders. Normally, an aircraft rudder is controlled by foot pedals and the pilot displaces either the right or left pedal to yaw the aircraft to the right or left respectively.

Jet aircraft also need to have a nose wheel steering system for control of the aircraft while on the ground. It is desirable to use the same foot pedals to control the rudder in flight and the nose wheel on the ground. However, the nose wheel steering may be operated by a fluid power system as part of a 'steer by wire' system.

Since the same foot pedals are used for both in flight and on the ground control of the aircraft, it is important that nose wheel steering is enabled only when the aircraft is on the ground as sensed for, by example, a switch actuated when the weight of the aircraft is carried by the landing gear.

When the nose wheel steering system is enabled, the pilot may displace either pedal to turn the nose wheel in the respective direction. The pedal displacement generates an electrical signal that actuates a fluid cylinder to turn the nose wheel and steer the aircraft to the right or left. One potential problem with a steer by wire system is that the nose wheel may not automatically return to a "centered" position after the pilot releases a foot pedal.

Therefore, there exists a need in the art for an aircraft nose wheel steer by wire steering system in which the nose wheel is automatically returned to a centered position when the pilot releases the foot pedals and in which biasing forces applied to center the nose wheel are not applied when in flight.

SUMMARY

The present invention is directed toward an aircraft nose wheel steer by wire steering system in which the nose wheel is automatically returned to a centered position when the pilot releases the foot pedals and in which biasing forces applied to center the nose wheel are not applied when in flight.

The apparatus of the present invention is particularly suited for use in jet aircraft wherein a purely mechanical linkage system is used to connect foot pedals to the rudder for in flight use and wherein the same pedals are used in connection with a fluid operated nose wheel steering system during taxiing.

In accordance with the present invention, an apparatus for operating an aircraft nose wheel steering mechanism includes right and left pedals, a steering assembly, and a biasing assembly. The pedals have a neutral position and are being operatively connected to one another so that forward displacement of one pedal results in rearward displacement of the other pedal. The steering assembly is connected between the pedals and a nose wheel and is operable to turn the nose wheel either right or left from a centered position in response to forward displacement of either the right or left pedal, respectively. The biasing assembly is operatively connected to the pedals and urges the pedals toward their neutral position. The neutral position corresponds to the centered position of the nose wheel.

In further accordance with the present invention, when a forwardly displaced pedal is released, the biasing assembly returns the pedals to their neutral position and causes the nose wheel to return to its centered position.

BRIEF DESCRIPTION OF THE DRAWINGS

These and further features of the present invention will be apparent with reference to the following description and drawings, wherein.

DETAILED DESCRIPTION

Figure 1:
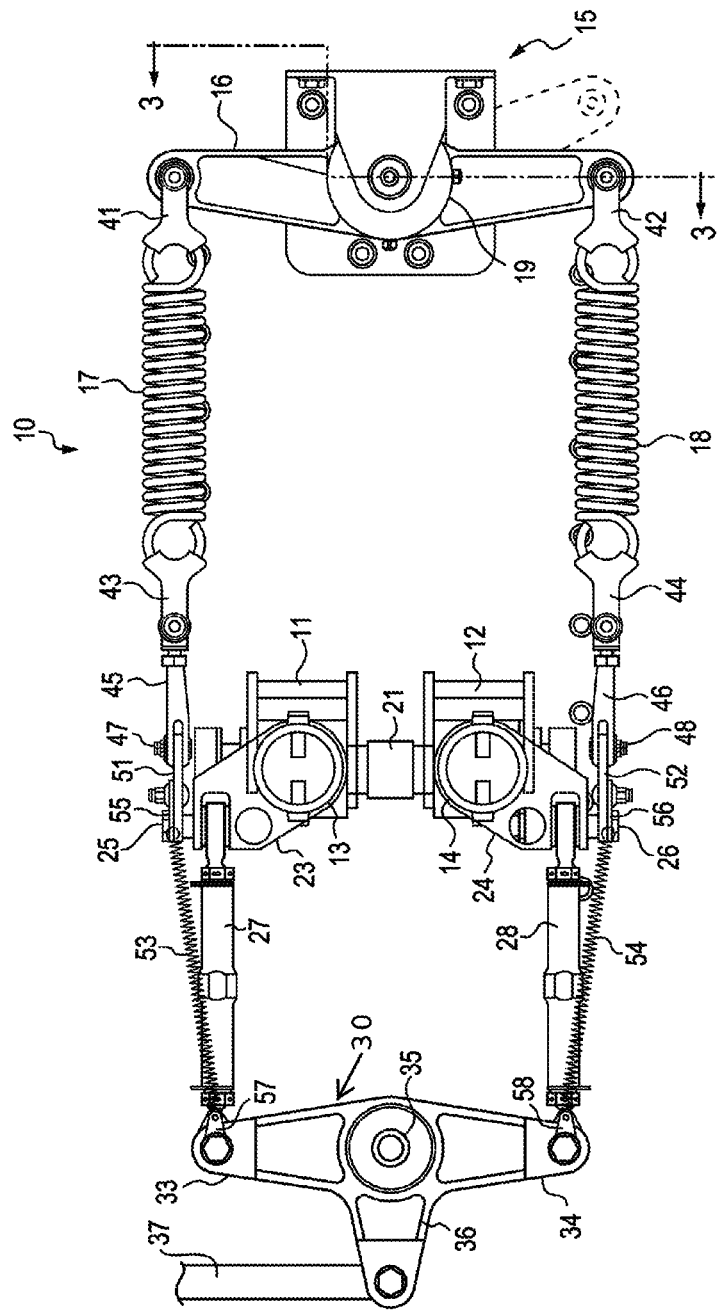
FIG. 1 is a plan view showing an apparatus for controlling an aircraft nose wheel steering system according to an exemplary embodiment of the invention.
Figure 2:
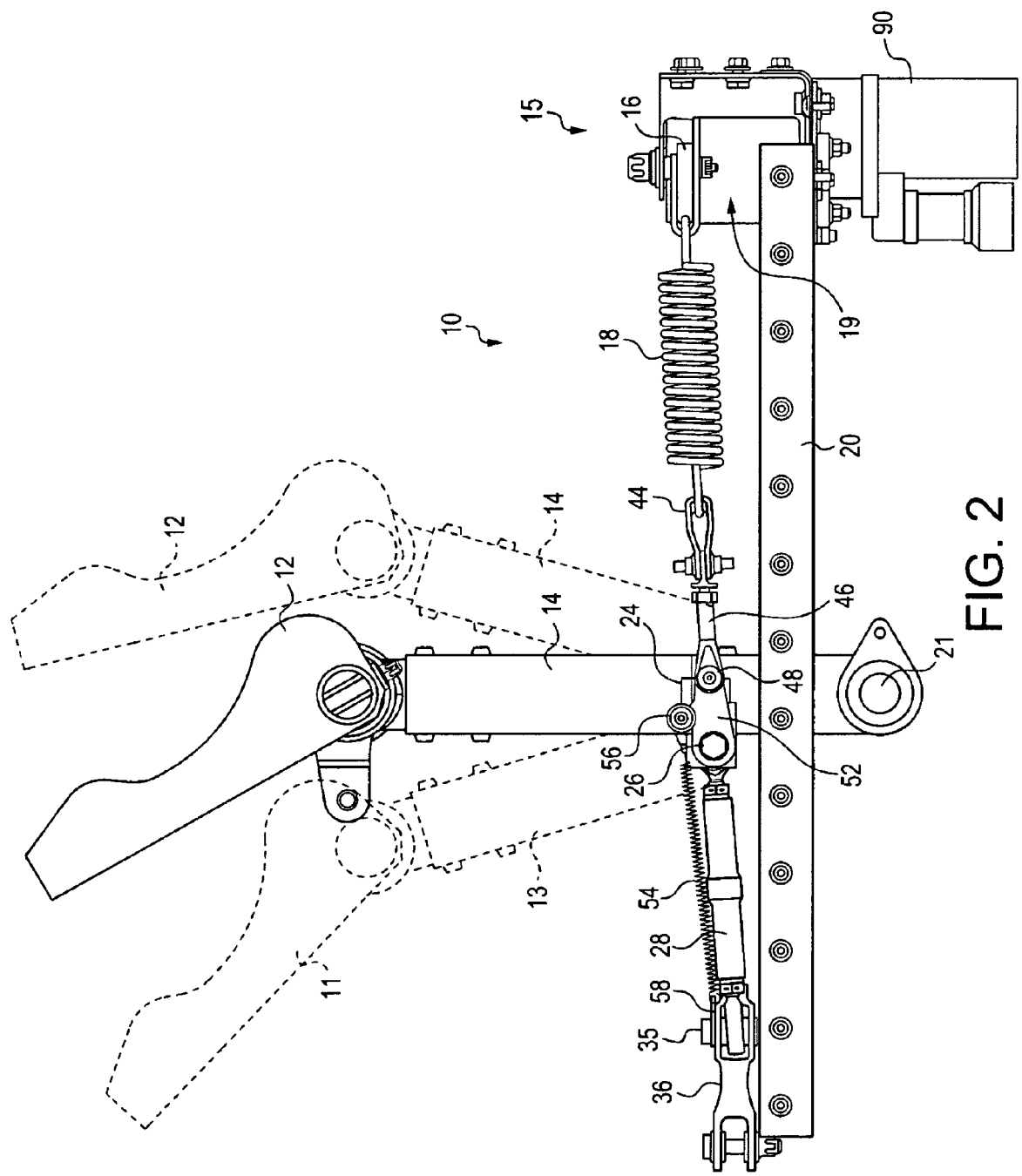
FIG. 2 is a side elevation of the apparatus of FIG. 1.
Figure 7:
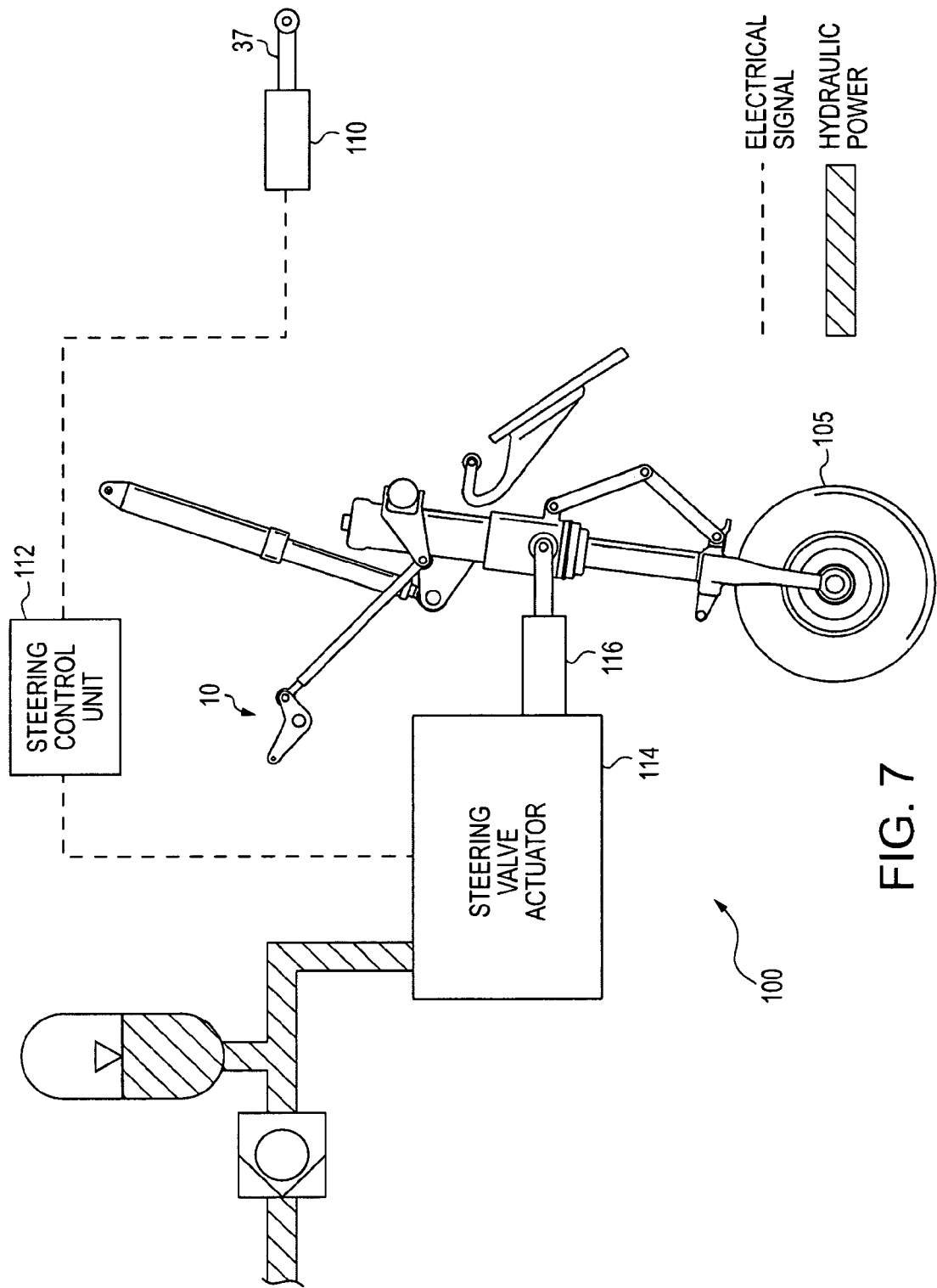
FIG. 7 schematically illustrates components of a steer-by-wire system according to an exemplary embodiment of the invention.

Referring more particularly to the drawings and initially to FIGS. 1, 2, and 7, there is shown a pedal operated apparatus for controlling an aircraft nose wheel steering system 100 for use while on the ground. The apparatus includes a device that centers the nose wheel 105 after a turn is completed and foot pedals 11, 12 are released.

As is typical, there are dual controls so that both the pilot and copilot can control the aircraft from their respective stations. Accordingly, there are two sets of steering pedals, either of which may be used to control the rudder while in flight and to control the nose wheel steering system while on the ground. However, for the purpose of this description, only the pilot's set of rudder pedals will be shown and described.

The pedal assembly 10 includes a right pedal 11 and a left pedal 12, the pedals being mounted on right and left pedal support arms 13, 14 respectively, for forward and rearward displacement. The pedals 11, 12 are supported by the pedal support arms 13, 14 so as to have a common neutral position and so that forward displacement of one pedal results in corresponding rearward displacement of the other as shown in dashed lines in FIG. 2.

The nose wheel steering system is a steer by wire system that is enabled only when the aircraft is on the ground, such as in response to a weight sensor signal indicating that the aircraft weight has been applied to the landing gear. With the system enabled, the pilot may displace either pedal 11, 12 to turn the nose wheel 105 in the respective direction. The pedal displacement is sensed by a transducer 110, which generates an electrical signal that is supplied to a controller 112. The controller 112 controls activation of a fluid cylinder 116 via a steering valve actuator 114 to turn the nose wheel 105 and steer the aircraft right or left.

The pedal support arms 13, 14 are mechanically connected to the aircraft rudder for operating the rudder during flight. Various mechanical linkage systems for connecting pedals to an aircraft rudder are well known in the art and no particular system will be described herein.

The pedal assembly 10 includes a nose wheel centering mechanism 15 for returning the aircraft nose wheel to a centered position after completion of a turn and at the same time, returning the pedals 11, 12 to their neutral position. The mechanism 15 includes a centering lever 16 mounted on a spindle for pivotal movement about a central vertical axis and spaced aft from the rudder pedals. The opposite ends of the arms of the lever 16 are connected to the right and left pedal support arms 13,14 by right and left helical springs 17, 18, respectively. The springs 17, 18 are in an at-rest position (no compression/no tension) when the pedals are in the neutral position.

In this regard it is noted that a predetermined amount of tension is an amount of tension desired and necessary to return the pedals to the "neutral" position. Further, insofar as similar springs may be provided on the co-pilot pedals, the spring force provided by each individual spring 17, 18 may be less than the total spring force desired. In other words, if identical springs are used on the pilot and copilot pedals, the spring force of each spring 17, 18 may only be ¼ of the total spring force desired. If springs are only used on the pilot pedals, then these springs 17, 18 would each provide ½ of the total desired spring force.

When the aircraft is on the ground, the lever 16 is locked in the position shown in FIG. 1 and the springs 17, 18 bias the pedal support arms 13, 14, and thus the rudder pedals 11, 12, to their neutral position. When a pedal is displaced forwardly by the pilot with the lever 16 in its locked condition, the respective spring, 17 or 18, applies a resistive force that increases progressively with the amount of pedal displacement, as described more fully hereinafter.

When the aircraft is in flight, however, the lever 16 is released or unlocked and is free to pivot about its axis as shown in dashed lines in FIG. 1 so that the springs 17, 18 do not effect the movement of the pedals 11, 12 and so that the pilot does not have to work against the bias of the springs 17, 18. A lever locking/unlocking device 19 is provided in order to lock the centering lever 16 in its fixed position when the aircraft is on the ground and to unlock the lever when the aircraft is in flight. The device 19 is actuated by a signal from a sensor, such as a weight sensor which detects that the weight of the aircraft is being carried by the landing gear.

The pedal assembly 10 is supported on a frame 20 that forms part of the floor of the aircraft. The right and left pedal support arms 13, 14 are pivotally supported at their lower ends on a fixed shaft 21 mounted on the frame and extending from side to side. Each of the support arms 13, 14 has a bracket 23, 24, located below the pedals. Each bracket has a pin 25, 26 mounted in a forked portion of its bracket. The pins 25, 26 serve to connect a pair of actuator rods 27, 28, respectively, between the brackets and a bell crank 30.

The rearward ends of the actuator rods 27, 28 are pivotally connected to the pins 25, 26 and the forward ends are pivotally connected, through pivot links 31, 32 to the oppositely extending arms 33, 34 of the bell crank 30, which has a "T" shaped configuration. The bell crank 30 is supported midway between the arms 33, 34 on a spindle 35 for limited pivotal movement about a vertical axis. With this arrangement, the bell crank 30 serves to interconnect the pedals 11, 12 so that forward displacement of one pedal results in rearward displacement of the other.

The bell crank 30 also has a forwardly extending leg 36 that connects the pedal assembly 10 to another pedal assembly (e.g., a copilot pedal assembly). The connection is provided by means of a rod 37 that connects the leg 36 to a corresponding bell crank leg forming part of the other pedal assembly. Further, a transducer 110 (FIG. 7) is operatively connected to the rod 37 and serves to detect movement of the rod 37 and, thus, movement of the pedals 11, 12. The transducer 110 communicates the detected movement as an electrical signal to the steering control unit 112 which, in turn, actuates the steering valve actuator 114 and fluid cylinder 116 to turn the nose gear 105 in accordance with the pedal movement.

The nose wheel centering mechanism 15 as briefly described above is enabled only when the aircraft is on the ground so that the pilot can use the foot pedals 11, 12 to operate the nose wheel steering system 100. The mechanism 15 serves to return the nose wheel 105 to its centered position once the pilot releases a foot pedal 11, 12 that has been displaced forwardly to steer the aircraft.

Figure 2A:
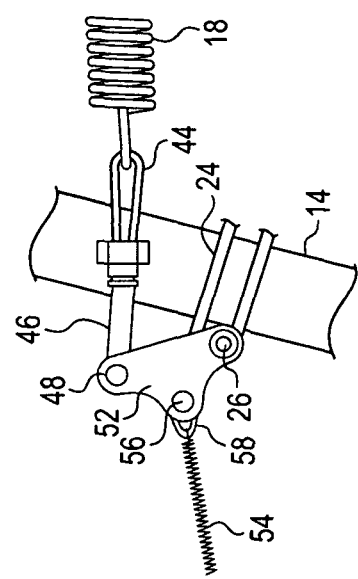
FIG. 2A is a fragmentary side elevation on an enlarged scale showing a swivel plate of the apparatus of FIG. 1 in its pivoted position.
Figure 3:
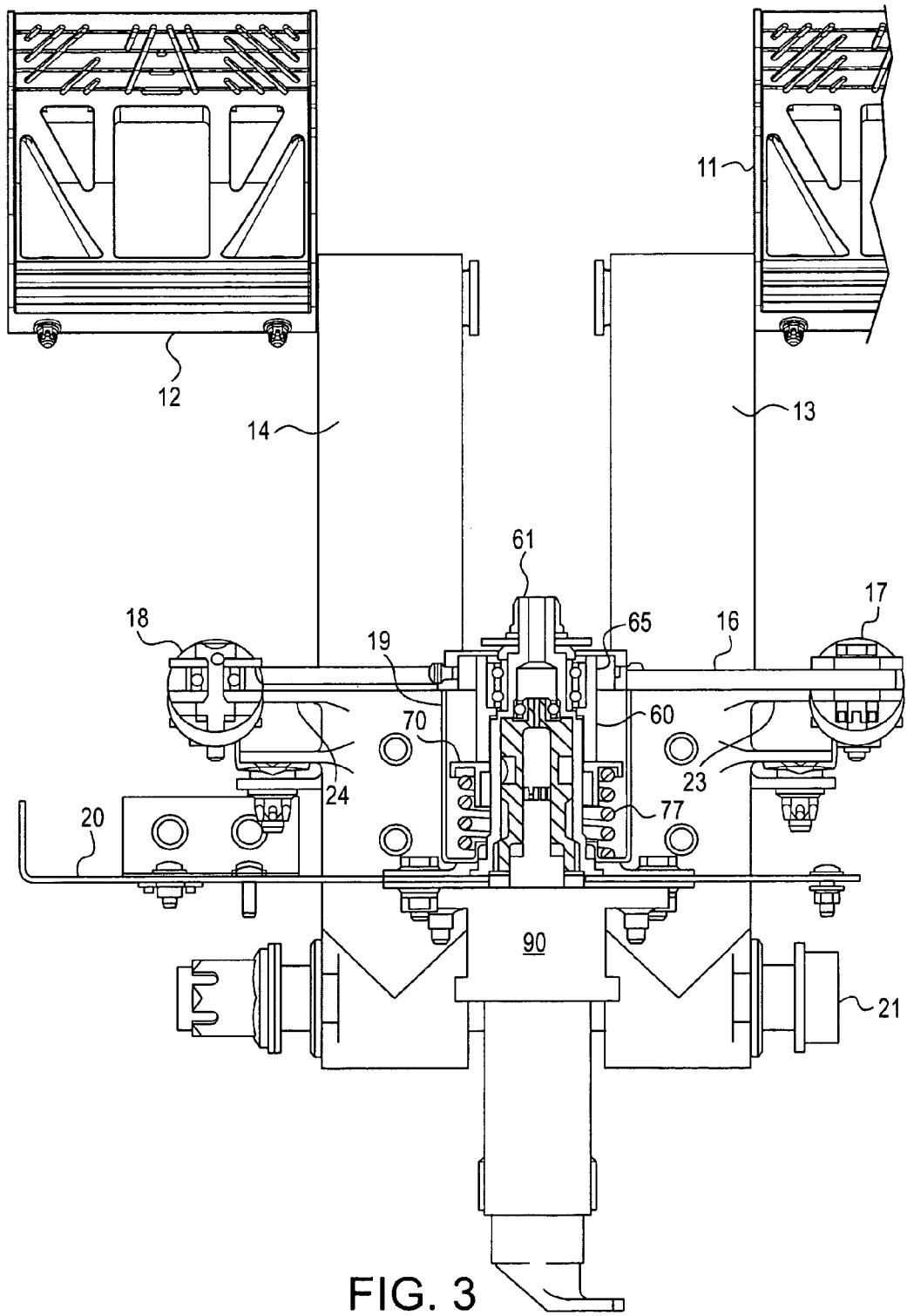
FIG. 3 is a sectional view on an enlarged scale of the apparatus of FIGS. 1 and 2, taken on the line 3-3 of FIG. 1.
Figure 4:
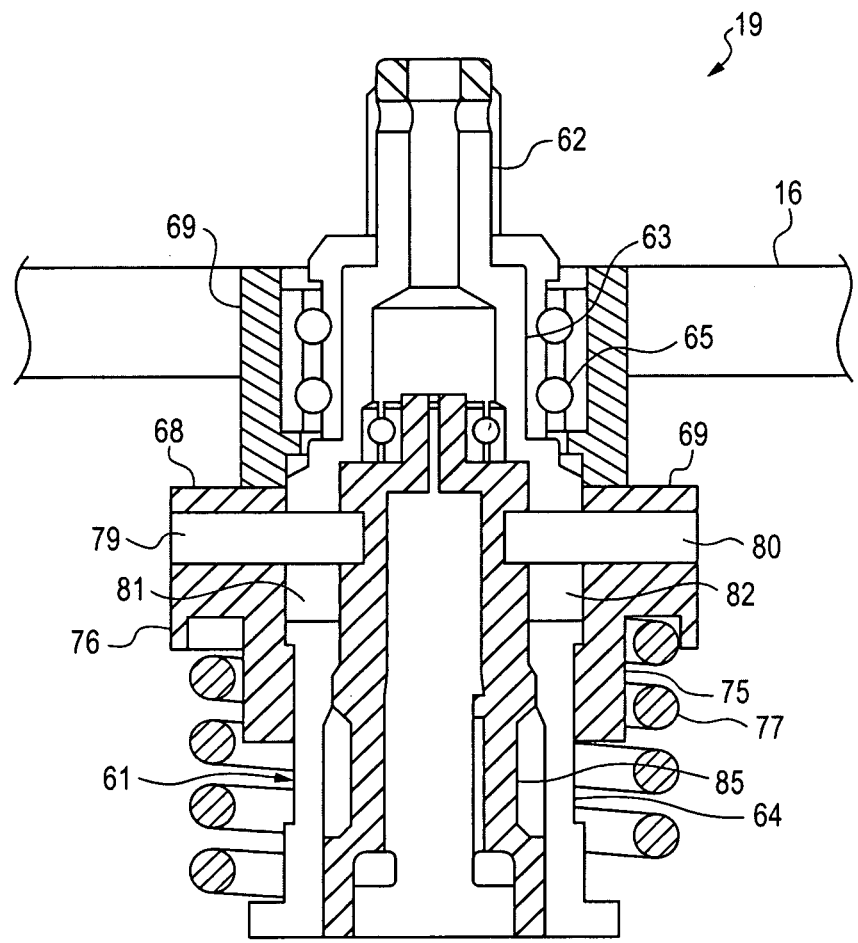
FIG. 4 is a sectional view on an enlarged scale of a lever locking/unlocking device for an apparatus for controlling an aircraft nose wheel steering system according to an exemplary embodiment of the invention.
Figure 5:
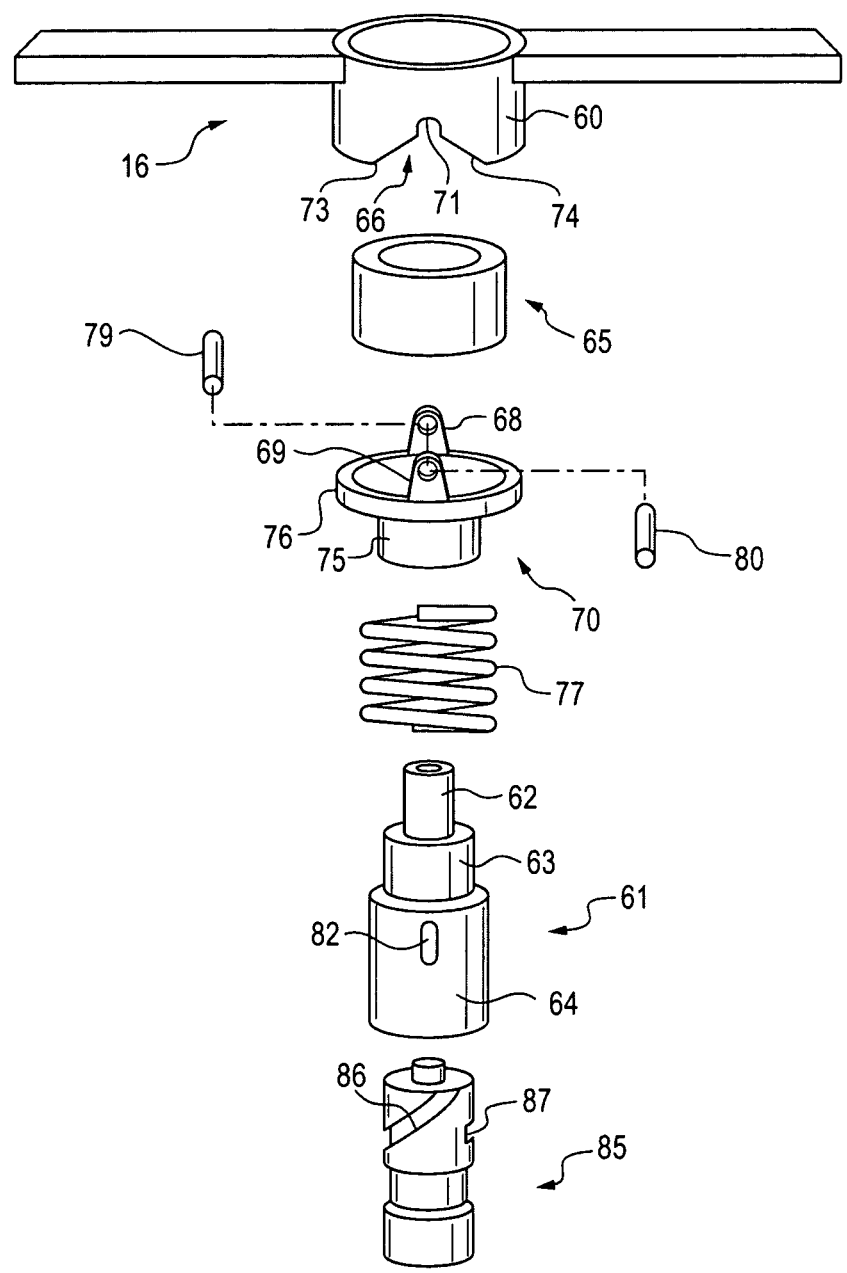
FIG. 5 is an exploded isometric projection of the lever locking/unlocking device of FIG. 4.
Figure 6:
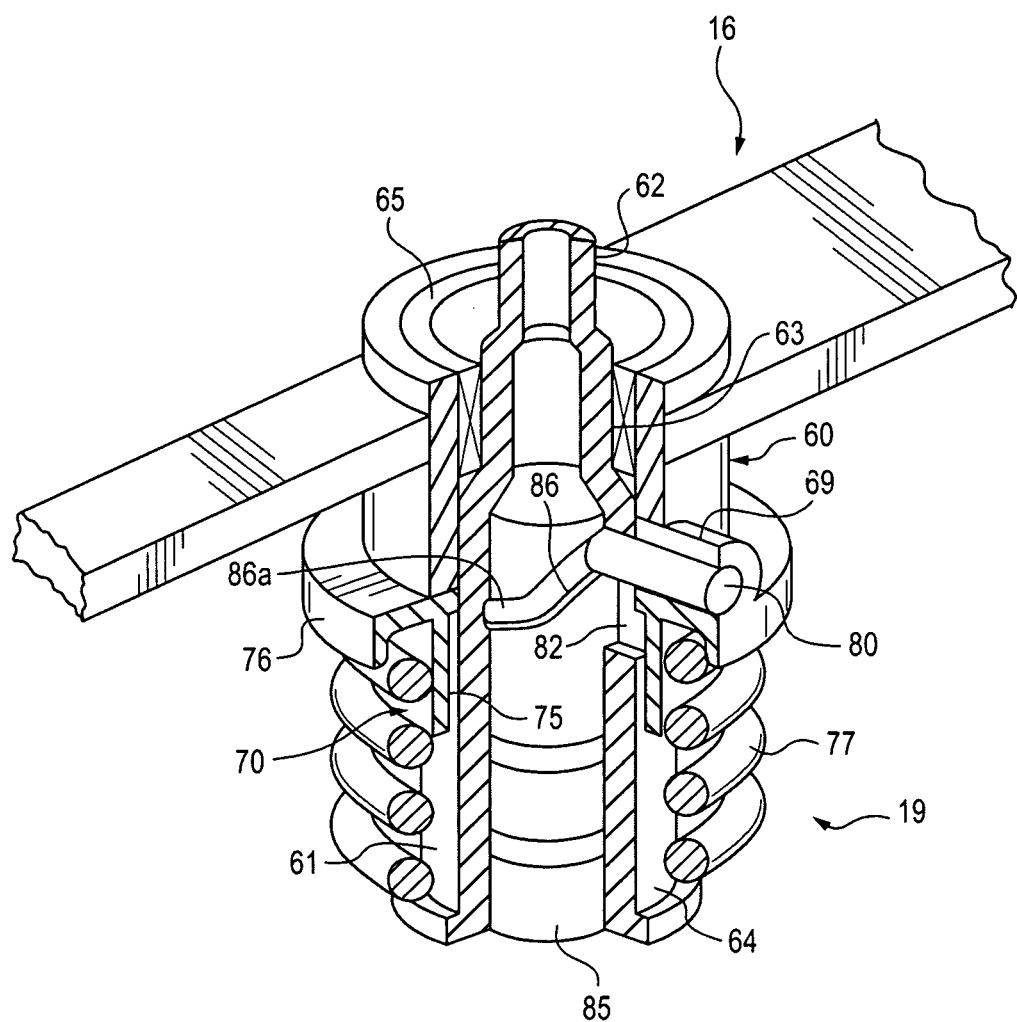
FIG. 6 is an isometric projection of the lever locking/unlocking device of FIG. 4, with parts broken away and shown in section.

With reference to FIGS. 1, 2 and 2A, the mechanism 15 includes as its primary components, the centering lever 16 and the right and left centering springs 17, 18. The aft ends of the springs 17, 18 each have a fitting 41, 42 adapted to form a pivotal connection between the respective spring 17, 18 and the respective end of the lever 16. The forward ends of the springs 17, 18 each have a similar fitting 43, 44 adapted to form a pivotal connection between the respective spring and one of a pair of links 45, 46. Each link 45, 46 is in turn pivotally connected to a respective swivel plate 51, 52 via fasteners 47, 48.

The purpose of the swivel plates 51, 52 is related to the rearward displacement of a pedal support arm 13, 14 when the other support arm 14, 13 is displaced forwardly. The forward displacement of one pedal stretches the respective spring and increases its tension. The other spring is compressed until it reaches maximum compression. When the spring reaches its completely compressed condition, it no longer serves as a source of resistance to pedal movement.

The swivel plates 51, 52, as shown in FIG. 2a, pivot upwardly and forwardly to accommodate further movement of the pedal support arm being rearwardly displaced. To accomplish this, the swivel plates 51, 52 are each pivotally supported at their forward end by means of the pins 25, 26 that serve to connect the links 31, 32 to the support arm brackets 23, 24. Also, the plates 51, 52 each have an upward extensions between their forward and rearward ends. These upward extensions serve as connection points for a pair of control springs 53, 54 that are connected to the respective swivel plates by fasteners 55, 56. The fasteners 55, 56 are so located on the respective swivel plates 51, 52 that the springs 53, 54 tend to pivot the plates upwardly and forwardly about the axis of the pins 25, 26.

Figure 8:
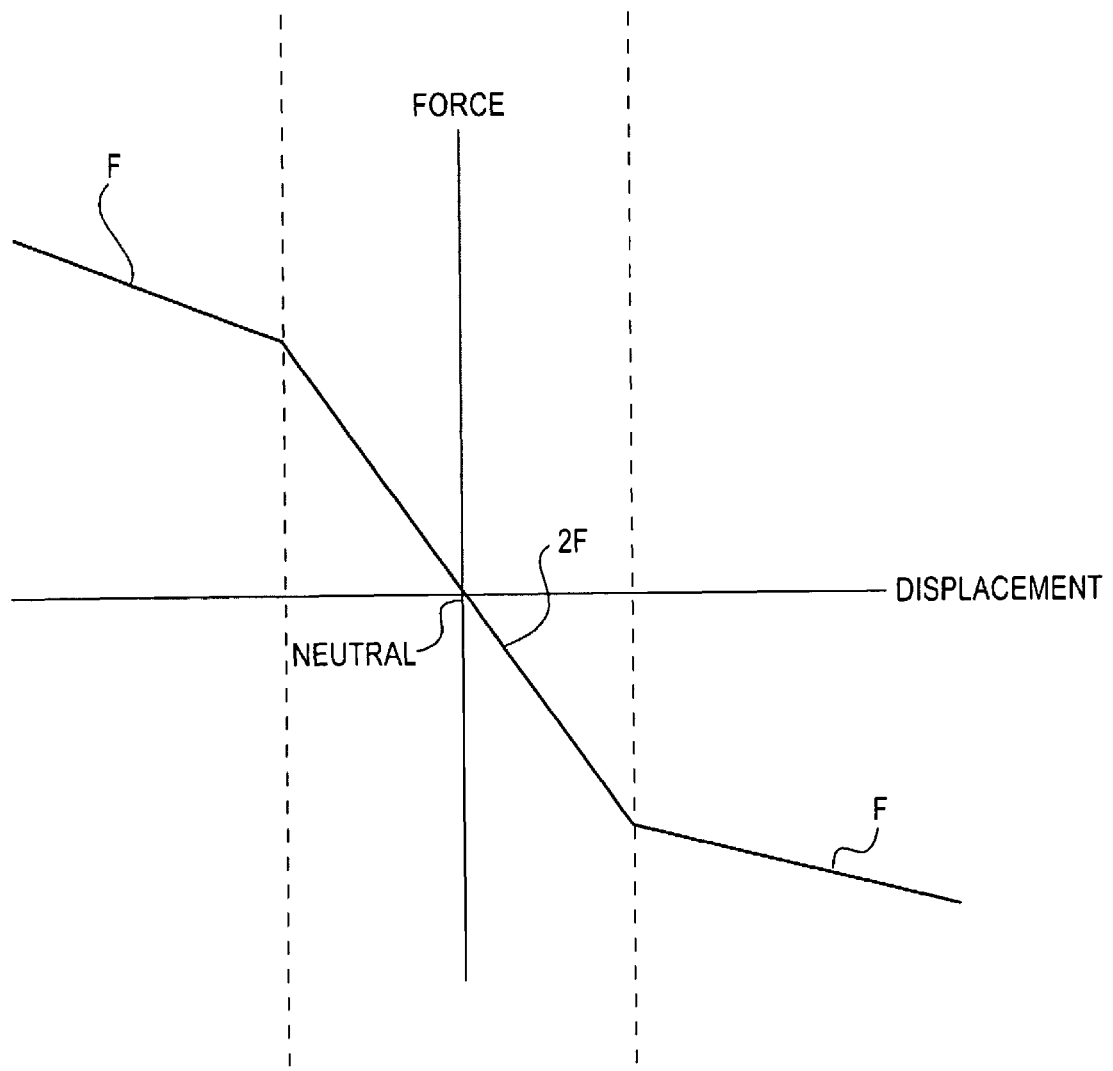
FIG. 8 is a graph illustrating spring force of a biasing assembly of the apparatus of FIG. 1 relative to displacement of pedals of the apparatus.

For this reason, a varying degree of force is required to move the pedals 11, 12. This is illustrated schematically in FIG. 8, wherein it is shown that in a region surrounding a neutral position of the pedals, the pilot must work against both springs 17, 18, and assuming that the spring force of each spring is equal to F, the total spring force is equal to 2F. However, at a location nearer the end of pedal movement, one of the springs (the compressed spring) is no longer providing a biasing force, and thus the spring force is reduced to 1F. This also is the case, albeit reversed, when the pedals are released. As such, a relatively greater biasing or restorative force is provided near a neutral position, which is helpful in returning the nose wheel 105 to a centered position.

The forward ends of the control springs 53, 54 are pivotally connected to the respective arms 33, 34 of the bell crank 30 by means of fittings 57, 58. The springs 53, 54 are mounted in a stretched or tensioned condition so that each spring urges the respective swivel plate 51, 52 to pivot upwardly whereby the forward ends of the links 45, 46 are guided in an arc.

In order to activate the nose wheel centering mechanism 15 it is necessary to lock the centering lever 16 in its fixed position to prevent its rotation when the foot pedals 11, 12 are displaced. This assures that the centering springs 17, 18 provide resistance to pedal displacement, as described above. The lever locking/unlocking device 19 provides a unique means for accomplishing the locking function.

The components of the device 19 are best shown in FIGS. 3-6 and include a hub 60 integral with the lever 16 and adapted to rotate on a fixed tubular spindle 61. The spindle 61 has an upper axial portion 62 having a relatively small diameter, a central axial portion 63 with a somewhat larger diameter, and a lower axial portion 64 with an even larger diameter. An annular shoulder is formed at the top of the lower portion 64.

The hub 60 is mounted for free rotation on the central axial portion 63 of the spindle 61 when the device is unlocked. An annular ball bearing assembly 65 fits between the inner surface of the hub 60 and the spindle central axial portion 63.

In order to lock the hub 60 against rotation, a vertically movable slide 70 is mounted on the lower portion 64 of the spindle 61 and is adapted to move in a vertical path between an upward position in locking engagement with the hub 60 and a downward position wherein the hub 60 is unlocked. The slide 70 is limited to vertical movement and its angular position relative to the spindle 61 remains fixed.

The hub 60 has opposed notches 66, 67 formed in the lower portion of its tubular wall. The notches 66, 67 are adapted to cooperate with latching teeth 68, 69 formed in the slide 70. The notches 66, 67 each have a detent 71, 72 that is adapted to receive one of the latching teeth 68, 69.

When the slide 70 moves upwardly from its unlocked position, the centering lever 16 and hub 60 may not be in the correct angular position for locking. When this occurs a means must be provided to rotate the lever 16 and hub 60 to the correct position so that the teeth 68, 69 can properly engage the detents 71, 72. To provide for this, the notches 66, 67 have a pair of downwardly facing ramp portions 73, 74 formed on opposite sides of their respective detent 71, 72. Either of the ramp portions 73, 74 may be engaged by one of the latching teeth 68, 69 during the upward movement of the slide 70 to rotate the hub 60 in the direction necessary to bring the teeth 68, 69 into engagement with the detents 71, 72. The slide 70 includes a sleeve portion 75 and a radial flange 76 at the upper end. The teeth 68, 69 are located on the top face of the flange 76.

A helical spring 77 fits over the outer surface of the sleeve portion 75 and rests against the lower surface of the flange 76. The spring 77 urges the slide 70 upward to its locking position. However, the spring 77 may be compressed sufficiently to permit the slide 70 to move downwardly to its unlocked position.

The slide 70 is driven in a vertical path of travel by pins 79, 80 secured in holes formed in the latching teeth 68, 69. The pins 79, 80 extend radially inward through vertical slots 81, 82 located on opposite sides of the lower portion 64 of the spindle 61. The engagement between the pins 79, 80 and the sides of the slots 81, 82 assures that the slide 70 is confined to a vertical path of travel. The pins 79, 80 extend radially inward beyond the inner wall of the spindle 61 into the interior space therewithin.

In order to unlock the device 19, the slide 70 must move downwardly against the force of the spring 77 and out of engagement with the hub 60. To accomplish this, a rotor 85 is received inside the lower portion 64 of the spindle 61 for selective rotation in a 90-degree angular path of travel. The rotor 85 rotates both clockwise and counterclockwise. In order to convert the rotary movement of the rotor 85 into linear movement of the slide 70, the outer surface of the rotor is provided with a pair of helical grooves 86, 87 that extend around the cylindrical surface about 90 degrees. The grooves 86, 87 include a flat portion (only one shown, 86*a*) to receive and hold the pins 79, 80 and prevent the spring 77 from moving the rotor 85 and thereby helps to hold the pins/rotor in the unlocked position.

The inner ends of the pins 79, 80 each extend into one of the respective grooves 86, 87. When the pins 79, 80 are located at the upper ends of the grooves 86, 87, the slide 70 is urged upward by the helical spring 77 into its locking position in which the teeth 68, 69 are seated in the detents 71, 72.

When the rotor 85 is turned (clockwise when viewed from below), the pins 79, 80 are forced downwardly due to their engagement with the helical grooves 86, 87 to compress the spring 77 and carry the slide 70 downward out of locking engagement with the hub 60. The pins 79, 80 enter the flat portions 86*a* of the grooves 86, 87 to hold the rotor 85 in the unlocked condition. This releases the centering lever 16 and enables it to pivot freely.

The rotor 85 is connected to a rotary actuator 90 mounted on the frame 20 below the device 19. The actuator 90 is adapted to turn the rotor 85 in 90 degree increments in forward and reverse directions. The actuator 90 is controlled by a signal, such as a signal from a sensor in response to whether or not the weight of the aircraft is being carried by the aircraft landing gear. It is contemplated that other signals indicative of the aircraft being on the ground could be used instead of the weight signal.

Accordingly, when the aircraft is on the ground, the device 19 is in its locked condition and the centering lever 16 is turned to its position shown in FIG. 1. In this condition the springs 17, 18 urge the pedals 11, 12 to their neutral position and the nose wheel to its centered position.

On the other hand, when the aircraft is in flight, the device 19 is in its unlocking condition and the centering lever 16 is free to pivot about its axis with no effect on the pedals.

While the inventions have been shown and described with respect to specific embodiments thereof, this is intended for the purpose of illustration rather than limitation and other variations and modifications will be apparent to those skilled in the art, all within the intended spirit and scope of the invention. Accordingly, the patent or patents are not to be limited in scope and effect to the specific devices herein shown and described nor in any other way that is inconsistent with the extent to which the progress in the art has been advanced by the inventions.

What is claimed is:
1. An apparatus for operating an aircraft nose wheel steering mechanism including:
right and left pedals having a neutral position and being operatively interconnected so that forward displacement of one pedal results in rearward displacement of the other, a steering assembly connected between the pedals and a nose wheel and operable to turn the nose wheel either right or left from a centered position in response to forward displacement of either the right or left pedal, respectively, a biasing assembly operatively connected to the pedals and urging the pedals to their neutral position, said neutral position corresponding to the centered position of the nose wheel, whereby when a forwardly displaced pedal is released, the biasing assembly returns the pedals to their neutral position and causes the nose wheel to return to its centered position, and wherein said biasing assembly is only operable to urge the pedals to the neutral position when the aircraft is on the ground, wherein the biasing assembly includes first and second springs, each spring being connected to a respective pedal so that the springs resist forward displacement of their respective pedal, and wherein each spring exerts a spring force resisting pedal movement until the spring is completely compressed and, after the spring is completely compressed, the compressed spring no longer exerts further spring force resisting pedal movement.

2. The apparatus as defined in claim 1 wherein the steering assembly includes a transducer for sensing a direction and amount of pedal displacement.

3. An apparatus for operating an aircraft nose wheel steering mechanism including:
right and left pedals having a neutral position and being operatively interconnected so that forward displacement of one pedal results in rearward displacement of the other,
a steering assembly connected between the pedals and a nose wheel and operable to turn the nose wheel either right or left from a centered position in response to forward displacement of either the right or left pedal, respectively,
a biasing assembly operatively connected to the pedals and urging the pedals to their neutral position, said neutral position corresponding to the centered position of the nose wheel, whereby when a forwardly displaced pedal is released, the biasing assembly returns the pedals to their neutral position and causes the nose wheel to return to its centered position, and wherein said biasing assembly is only operable to urge the pedals to the neutral position when the aircraft is on the ground, wherein the biasing assembly includes first and second springs, each spring being connected to a respective pedal so that the springs resist forward displacement of their respective pedal, and wherein the springs cooperate to exert a first biasing force on the pedals in a first region of pedal movement adjacent a neutral position, and cooperate to exert a second biasing force on the pedals in a second region of pedal movement remote from said neutral position and distinct from said first region, wherein said first biasing force is greater than said second biasing force.

4. The apparatus as defined in claim 3, wherein the first biasing force is generally twice the second biasing force.

5. The apparatus as defined in claim 4, further comprising:
a sensor for determining that the aircraft is on the ground;
a lever; and,
a lever locking and unlocking assembly;
wherein the lever is placed in a locked condition by the locking and unlocking assembly in response to a signal from the sensor indicating that the aircraft is on the ground, and wherein the lever is otherwise in an unlocked condition.

6. The apparatus as defined in claim 5, wherein the biasing assembly is secured to the lever.

7. An apparatus for steering an aircraft, including:
right and left pedals having a neutral position and being operatively interconnected so that forward displacement of one pedal results in rearward displacement of the other,
a steering assembly connected between the pedals and a nose wheel and a rudder and operable to turn the nose wheel and/or the rudder either right or left from a centered position in response to forward displacement of either the right or left pedal, respectively,
a biasing assembly having springs with first ends operatively connected to the pedals and being operable to urge the pedals toward their neutral position, said neutral position corresponding to the centered position of the nose wheel and rudder;
a lever to which second ends of the springs of the biasing assembly are attached; and,
a lever locking and unlocking assembly;
wherein the lever is placed in a locked condition by the locking and unlocking assembly when the aircraft is determined to be on the ground so as to enable steering of the nose wheel against biasing forces of the biasing assembly, and wherein the lever is placed in an unlocked condition by the lever locking and unlocking assembly and thereby disabling the biasing assembly when the aircraft is determined to be airborne so as to permit steering of the aircraft via the rudder without working against the biasing forces of the biasing assembly;
and wherein, when the aircraft is on the ground and a forwardly displaced pedal is released, the biasing assembly returns the pedals to their neutral position and the steering assembly causes the nose wheel to return to its centered position.

8. The apparatus as defined in claim 7, wherein the steering assembly includes a transducer for sensing a direction and amount of pedal displacement.

9. The apparatus as defined in claim 8, wherein the springs of the biasing assembly include first and second springs, each spring being operatively connected to a respective pedal so that the springs resist forward displacement of their respective pedal, wherein each spring exerts a spring force resisting pedal movement until the spring is completely compressed and, after the spring is completely compressed, the compressed spring no longer exerts further spring force resisting pedal movement.

10. The apparatus according to claim 9, wherein the springs cooperate to exert a first biasing force on the pedals in a first region of pedal movement adjacent a neutral position, and cooperate to exert a second biasing force on the pedals in a second region of pedal movement remote from said neutral position and distinct from said first region, wherein said first biasing force is greater than said second biasing force.

11. The apparatus as defined in claim 10, wherein the first biasing force is generally twice the second biasing force.

12. An apparatus for operating an aircraft rudder and nose wheel steering mechanism comprising:
right and left pedals having a neutral position and being operatively interconnected so that forward displacement of one pedal results in rearward displacement of the other,
a mechanical linkage operatively connecting the pedals to the rudder, a transducer for sensing pedal movement and providing an electrical signal that is used to actuate a drive assembly to turning the aircraft nose wheel in either direction from a centered position, a lever having a central pivot axis and having an unlocked condition wherein the lever is free to turn about its axis and a fixed condition wherein the lever is locked against turning movement, first and second springs, said first spring being operatively connected between a first end of said lever and the first pedal and said second spring being operatively connected between the second end of said lever and said second pedal so that when the lever is locked springs resist forward displacement of either pedal and when the lever is unlocked and freely turned without resistance from the springs, and a lever locking and unlocking assembly that is operable to unlock the lever when the aircraft is in flight and to lock the lever in its fixed position when the aircraft is on the ground.

13. The apparatus as defined in claim 12, wherein the lever has a tubular hub that defines a downwardly facing detent, and wherein the lever locking and unlocking assembly includes:

a slide movable in a vertical path of travel between an upward position wherein it engages the detent to lock the lever and a downward retracted position spaced away from the detent so that the lever is unlocked, a spring urging the slide upward to the locking position, and a drive device for selectively forcing the slide downwardly against the force of the spring to the retracted unlocking position.

14. The apparatus as defined in claim 13, wherein the spring is a helical spring coaxial with the hub and the slide.

15. The apparatus as defined in claim 14, wherein the means for retracting the slide comprises:

a rotor mounted coaxially with the hub, a rotary actuator adapted to turn the rotor in angular increments, and a conversion device for converting angular movement of the rotor to linear movement of the slide of the slide.

16. The apparatus as defined in claim 15, wherein the conversion device includes:

a tubular spindle that supports the hub for pivotal movement thereon and that supports the slide, the spindle having a vertical guide formed in its tubular wall and the slide having radially extending guide elements extending through the tubular wall and engageable with the vertical guide, a support for means supporting the rotor for rotary movement within the spindle, the rotor having helical grooves formed therein and adapted to receive the guide elements of the slide, whereby angular movement of the rotor forces the guide elements downward against the force of the spring to disengage the slide from the detents in the hub and unlock the lever.

17. The apparatus as defined in claim 16, wherein the vertical guide includes a pair of opposed vertical slots extending through the tubular wall of the spindle.

18. The apparatus as defined in claim 17, wherein the guide elements in the slide comprise opposed pins extending radially inward through the slots in the spindle and into the helical grooves in the rotor.

19. The apparatus as defined in claim 3 further comprising:

a lever; and, a lever locking and unlocking assembly for placing the lever in a locked condition when the aircraft is on the ground, and otherwise placing the lever in an unlocked condition, and further wherein the biasing assembly has springs with first ends operatively connected to the pedals and being operable to urge the pedals toward their neutral position, and second ends attached to the lever.

* * * * *

UNITED STATES PATENT AND TRADEMARK OFFICE
CERTIFICATE OF CORRECTION

| | | |
|---|---|---|
| PATENT NO. | : 8,544,791 B2 | Page 1 of 1 |
| APPLICATION NO. | : 12/415120 | |
| DATED | : October 1, 2013 | |
| INVENTOR(S) | : Hiroki Oyama et al. | |

It is certified that error appears in the above-identified patent and that said Letters Patent is hereby corrected as shown below:

Title page, item (73) Assignee should read as follows: Honda Patents & Technologies North America, LLC, Torrance, CA (US)

Signed and Sealed this
Eighth Day of April, 2014

Michelle K. Lee
*Deputy Director of the United States Patent and Trademark Office*